United States Patent Office 3,270,011
Patented August 30, 1966

3,270,011
5,7-DISUBSTITUTED-2,3,6,8-TETRAKETO-
PYRIMIDO[5,4-b]1,4-THIAZINES
Elmer F. Schroeder, Chicago, Ill., assignor to G. D. Searle & Co., Chicago, Ill., a corporation of Delaware
No Drawing. Filed Oct. 5, 1964, Ser. No. 401,705
6 Claims. (Cl. 260—243)

This application is a continuation-in-part of my co-pending application Serial No. 105,541, filed April 26, 1961, now U.S. Patent No. 3,155,665.

The present invention is concerned with novel bicyclic heterocyclic organic chemical compounds possessing valuable pharmacological properties. These substances are, more particularly, 5,7-disubstituted-2,3,6,8-tetraketopyrimido[5,4-b]1,4-thiazines and are structurally represented by the following formula

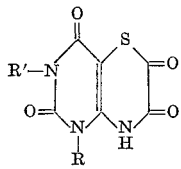

wherein R and R' are symbolic of lower alkyl, lower alkenyl, and chlorophenyl radicals.

Typical of the lower alkyl radicals represented in that formula are methyl, ethyl, propyl, butyl, pentyl, hexyl, and the branched-chain groups isomeric therewith. The lower alkenyl radicals therein depicted are exemplified by vinyl, allyl, methallyl, crotyl, propenyl, butenyl, pentenyl, hexenyl, and the branched-chain isomers thereof.

Starting materials suitable for the manufacture of the instant compounds are the 1-substituted-6-amino-uracils represented by the following formula

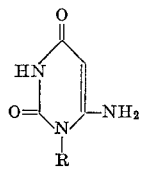

wherein R is as hereinbefore defined. Illustrative of the process utilizing these starting materials is the methylation of 1-p-chlorophenyl-6-aminouracil, typically with dimethyl sulfate in aqueous sodium hydroxide, to yield 1-p-chlorophenyl-3-methyl-6-aminouracil, chlorination of the latter substance in methanol in the presence of sodium bicarbonate to yield 1-p-chlorophenyl-3-methyl-5-chloro-6-aminouracil, reaction of that intermediate with mercaptoacetic acid in aqueous propanolic sodium hydroxide to produce 1-p-chlorophenyl-3-methyl-5-carboxymethylmercapto-6-aminouracil, and cyclization of that amino acid by heating with acetic anhydride, thus affording 5-p-chlorophenyl-7-methyl-3,6,8-triketopyrimido[5,4-b]1,4-thiazine. That substance can be converted directly to the instant 5-p-chlorophenyl-7-methyl-2,3,6,8-tetraketopyrimido[5,4-b]1,4-thiazine by oxidation with sulfuryl chloride in acetic acid or, alternatively, by chlorination with sulfuryl chloride in carbon tetrachloride followed by heating of the resulting 2,2-dichloro intermediate with glacial acetic acid.

The compounds of this invention display valuable pharmacological properties. They are, for example, hypotensive and diuretic agents.

The following examples describe in detail certain of the compounds illustrative of the present invention together with methods which have been devised for their manufacture. The invention, however, is not to be construed as limited thereby either in spirit or in scope since it will be apparent to those skilled in the art that many modifications both of materials and of methods may be practiced without departing from the purpose and intent of this disclosure. In the examples hereinafter detailed, temperatures are given in degrees centigrade (° C.) and quantities of materials in parts by weight except as otherwise noted.

Example 1

Method A.—A mixture of 5 parts of 2,2-dichloro-5-propyl-7-ethyl-3,6,8-triketopyrimido[5,4-b]1,4-thiazine with 50 parts of glacial acetic acid is heated on the steam bath for about 20 minutes with exclusion of moisture. At the end of that reaction period, the dark solution is diluted with 15 parts of hexane, then is cooled to room temperature. The precipitate which forms is collected by filtration, washed on the filter with hexane and dried in air to afford yellow crystals of 5-propyl-7-ethyl-2,3,6,8-tetraketopyrimido[5,4-b]1,4-thiazine, melting at about 235–237°. It is further characterized by the following structural formula

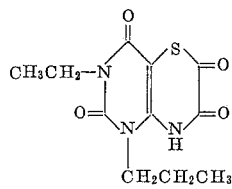

Method B.—A mixture of 27 parts of 5-propyl-7-ethyl-3,6,8-triketopyrimido[5,4-b]1,4-thiazine, 155 parts of glacial acetic acid, and 30 parts of sulfuryl chloride is allowed to stand at room temperature for about 30 minutes, then is heated at about 100° for about 40 minutes. The deep red solution thus obtained is cooled to about 50°, then is diluted with approximately 150 parts of hexane. The resulting precipitate is collected by filtration, washed on the filter with hexane and dried in air to producce 5-propyl-7-ethyl-2,3,6,8-tetraketopyrimido [5,4-b]1,4-thiazine, identical with the product of Method A.

Example 2

Method A.—The substitution of an equivalent quantity of 2,2-dichloro-5,7-dimethyl-3,6,8-triketopyrimido-[5,4-b]1,4-thiazine in the procedure of Method A of Example 1 results in 5,7-dimethyl-2,3,6,8-tetraketopyrimido[5,4-b]1,4-thiazine, melting at about 297–299° with decomposition. This compound is represented by the following structural formula

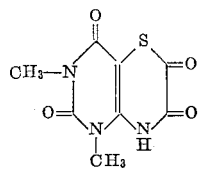

Method B.—To a suspension of 22.7 parts of 5,7-dimethyl-3,6,8-triketopyrimido[5,4-b]1,4-thiazine in 142 parts of glacial acetic acid is added 29.7 parts of sulfuryl chloride, and the resulting yellowish solution is heated on the steam bath for about 45 minutes, then is cooled to room temperature and diluted with hexane. Further cooling of the solution affords bright yellow crystals of 5,7-dimethyl - 2,3,6,8 - tetraketopyrimido[5,4-b]1,4-thiazine, identical with the product of Method A.

Example 3

To a suspension of 5.36 parts of 5-allyl-7-ethyl-3,6,8-triketopyrimido[5,4-b]1,4-thiazine with 28.4 parts of glacial acetic acid is added dropwise, over a period of about 5 minutes, 5.94 parts of sulfuryl chloride, resulting in complete solution and a spontaneous temperature rise to approximately 40°. The resulting reaction mixture is allowed to cool to room temperature, then is heated at 85–90° for about 30 minutes. Cooling of the mixture to about 60° followed by dilution with hexane results in the formation of bright yellow crystals of 5-allyl-7-ethyl-2,3,6,8-tetraketopyrimido[5,4-b]1,4-thiazine. These crystals are collected by filtration, washed on the filter with hexane, dried, and recrystallized from acetic acid to afford the pure substance, melting at about 193–195° with effervescence. This compound is represented by the following structural formula

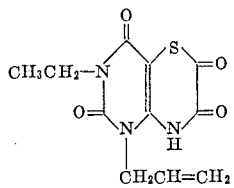

*Example 4*

The substitution of an equivalent quantity of 5-methallyl - 7 - methyl-3,6,8-triketopyrimido-[5,4-b]1,4-thiazine in the procedure of Example 3 results in 5-methallyl-7-methyl-2,3,6,8-tetraketopyrimido]5,4-b]1,4-thiazine.

*Example 5*

A mixture of 23.8 parts of 1-p-chlorophenyl-6-aminouracil, 8 parts of sodium hydroxide, and 240 parts of water is warmed to approximately 60° to effect solution, at which time 17.3 parts of dimethyl sulfate is added dropwise over a period of about 10 minutes. The resulting reaction mixture is heated at 70–75° for about 15 minutes, then is allowed to cool for several hours. The resulting precipitated solid is collected by filtration, washed with water, dried, then recrystallized from ethanol to afford colorless crystals of 1-p-chlorophenyl-3-methyl-6-aminouracil, melting at about 284–285°.

To a mixture of 25.2 parts of 1-p-chlorophenyl-3-methyl-6-aminouracil, 9.24 parts of sodium bicarbonate and 320 parts of methanol is added over a period of about 40 minutes, with stirring, an ice-cold solution of 7.1 parts of chlorine in 96 parts of carbon tetrachloride. The resulting reaction mixture is stirred for approximately 30 minutes longer, then is filtered to remove insoluble salts. The resulting filtrate is partially concentrated, then is cooled and allowed to stand at room temperature for several hours. The solid which separates is collected by filtration, washed thoroughly on the filter with water, then recrystallized from ethanol to yield colorless crystals of 1 - p-chlorophenyl-3-methyl-5-chloro-6-aminouracil, melting at about 257–259°.

A mixture of 17.2 parts of 1-p-chlorophenyl-3-methyl-5-chloro-6-aminouracil, 68 parts of water, 24 parts of n-propyl alcohol, 5.8 parts of sodium hydroxide and 6.1 parts of mercaptoacetic acid is heated at the reflux temperature for about one hour, then is stripped of solvent by distillation. The resulting mixture is diluted with water, allowed to stand for about 16 hours, then is filtered to remove a small amount of insoluble material. Acidification of the filtrate with hydrochloric acid results in separation of a gummy material which quickly solidifies upon standing to afford 1-p-chlorophenyl-3-methyl-5-carboxymethylmercapto-6-aminouracil as a colorless solid, melting at about 233–235°.

A mixture of 6.84 parts of 1-p-chlorophenyl-3-methyl-5-carboxymethyl-6-aminouracil and 28 parts of acetic anhydride is heated on the steam bath for about 4 hours, then is cooled to room temperature and diluted with approximately 100 parts of water. After the excess acetic anhydride has decomposed, the solid precipitate is collected by filtration, washed with water, then stirred with aqueous sodium bicarbonate to remove any unchanged starting material. Filtration of that mixture followed by washing of the filter cake with water affords 5-p-cholorophenyl - 7 - methyl - 3,6,8 - triketopyrimido[5,4-b]1,4-thiazine, melting at about 301–303° with effervescence.

To a stirred mixture of 32.4 parts of 5-p-chlorophenyl-7 - methyl - 3,6,8-triketopyrimido[5,4-b]1,4-thiazine with 315 parts of glacial acetic acid is added dropwise, over a period of about 15 minutes, 30 parts of sulfuryl chloride. The resulting mixture is stirred for about 30 minutes longer at room temperature, then is heated at 90–95° for about 40 minutes. The reaction mixture is cooled to about 60°, is diluted with approximately 200 parts of hexane, and is allowed to stand for about one hour. The resulting yellow crystalline solid is collected by filtration, washed successively on the filter with a 1:1 mixture of glacial acetic acid with hexane and with pure hexane to afford 5-p-chlorophenyl - 7 - methyl-2,3,6,8-tetraketopyrimido[5,4-b]1,4-thiazine. Recrystallization from dimethylformamide affords the pure substance, melting at about 273–275°. This compound is characterized further by the following structural formula

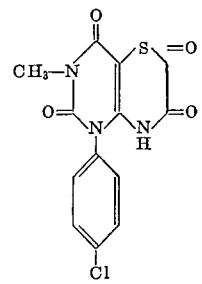

What is claimed is:
1. A compound of the formula

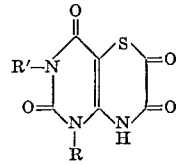

wherein R is a member of the class consisting of lower alkyl, lower alkenyl, and p-chlorophenyl radicals, and R' is a lower alkyl radical.

2. A compound of the formula

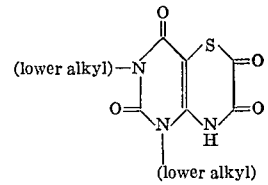

3. 5 - propyl - 7-ethyl-2,3,6,8-tetraketopyrimido[5,4-b] 1,4-thiazine.
4. 5,7 - dimethyl - 2,3,6,8-tetraketopyrimido[5,4-b]1,4-thiazine.
5. 5 - allyl - 7-ethyl-2,3,6,8-tetraketopyrimido[5,4-b]1,4-thiazine.
6. 5 - (p - chlorophenyl) - 7 - methyl-2,3,6,8-tetraketopyrimido[5,4-b]1,4-thiazine.

References Cited by the Examiner
UNITED STATES PATENTS 3,080,364   3/1963   Schroeder _____ 260—243
3,155,665   11/1964  Schroeder _____ 260—243

WALTER A. MODANCE, *Primary Examiner.*

JOHN M. FORD, *Assistant Examiner.*